Oct. 14, 1930.　　　J. A. O'NEIL　　　1,778,642
CLAMPING DEVICE
Filed Dec. 13, 1929
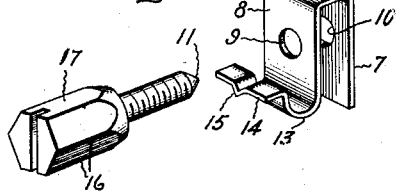
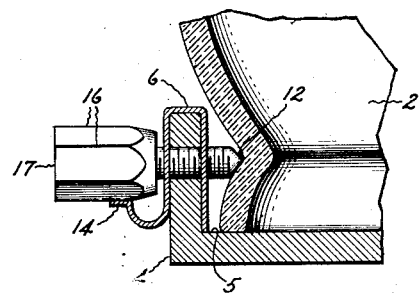
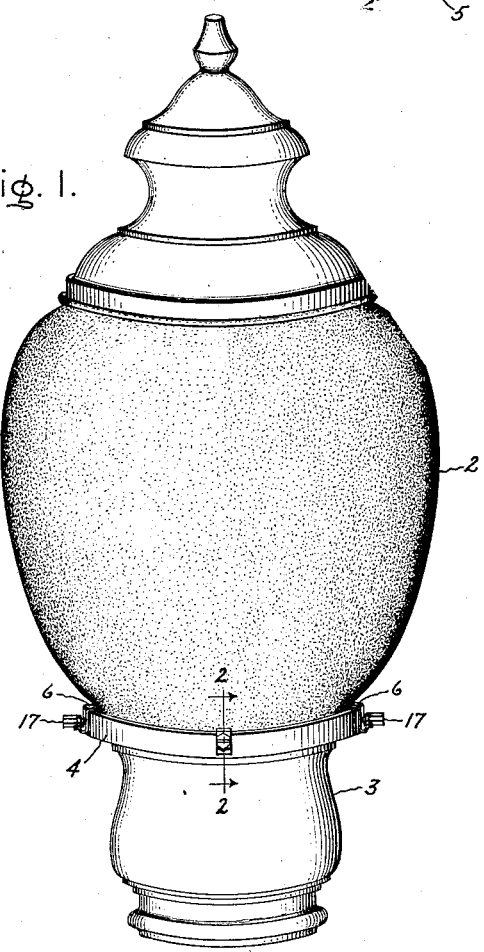
Inventor:
James A. O'Neil,
by Charles E. Mullen
His Attorney.

Patented Oct. 14, 1930

1,778,642

UNITED STATES PATENT OFFICE

JAMES A. O'NEIL, OF LYNN, MASSACHUSETTS, ASSIGNOR TO GENERAL ELECTRIC COMPANY, A CORPORATION OF NEW YORK

CLAMPING DEVICE

Application filed December 13, 1929. Serial No. 413,901.

My invention relates to a clamping device. More particularly it relates to a device of the above character especially adapted for use in clamping a globe to its support, as for example in a street lamp. Heretofore clamping devices of various types have been used for this purpose, but many of them have been subject to the objection that they become loose as a result of the vibrations produced, for example, by passing vehicles or the wind.

It is an object of my invention to provide a clamping device of general application, but which is especially adapted for use in connection with highway lighting units and which may be readily applied to the unit and locked in position without much effort.

It is an object of the invention to provide a clamping device comprising a screw element, a base element for receiving the screw and a locking element in operative relation to both the screw and the base element for preventing the screw from becoming loose after it has been set, but which will permit the screw to be readily turned until the proper adjustment has been obtained.

The invention, however, will be better understood from the following specification and claims, reference being had to the accompanying drawing, in which Fig. 1 shows a lighting unit in elevation with a globe secured to its base by means of clamping devices of the invention. Fig. 2 is an enlarged detailed view in elevation of a section of the unit of Fig. 1, said section being taken along line 2—2, Fig. 1. Fig. 3 shows the elements of the clamping device, Fig. 2, in a so-called exploded view and in perspective.

Referring to the drawing, the globe 2 is adapted to be received by the base element 3, which is provided with a flange 4 and with a ledge 5 which latter supports the globe 2. The flange 4 is provided with a number of threaded perforations, each of which is adapted to receive in threaded engagement therewith a screw 17. The flange is also adapted to receive a U or saddle-shaped locking element 6, the flange extending between the sides 7 and 8 of the element. Sides 7 and 8 are provided with perforations 9 and 10 respectively which are in alinement with the corresponding threaded opening in the flange 4. When the said elements are in the position shown, the screw 17 is inserted through the hole 9, into the corresponding hole in the flange 4, and brought into threaded engagement therewith, the screw being then turned until it advances and passes through the opening 10 on the other side of the element 6. The rotation of the screw is continued until the end 11 strikes the groove 12 near the lower rim of the globe, thereby locking the globe in position. The side 8 of the element 6 is provided with a section 13 which curves under the head of the screw and terminates in a flange 14 provided with an indentation 15. This indentation is V-shaped, and is adapted to receive any one of the several edges 16 formed along the side of the head of the screw. The curved section 13 is flexible so that notwithstanding the engagement of any of the edges 16 with the indented portions 15, the screw may be rotated by hand or by a screw-driver until it advances to the proper position, in which position it is held against rotation by the flange 14.

In this connection it will be noted that the locking means for the screw is effective even before the screw head 17 engages the side wall 8, the device being effective for any position of the screw wherein the head engages the flexible flange 14. It will also be noted that the U-shaped locking element 6 is held in position on the flange 4 by the screw 17. With the arrangement shown, the element 6 is prevented from rotating about the axis of the screw 17 by the flange 4, and in turn the element 6 prevents, through the medium of the section 13, the screw from rotating as a result of any vibrations to which the lighting unit may be subjected. I therefore provide a simple and effective clamping device which may be readily applied to or removed from a lighting unit, and which may be easily operated to clamp or unclamp the globe to or from the base.

By my invention I provide an improved locking device in which the locking element does not require any special means other than the clamping screw for attaching it to the flange. The invention has the further advantage that it may be applied to units that are already in stock or to any units that are installed and in actual operation. I provide, therefore, a simple and effective clamping device, which is inexpensive to manufacture and which may be readily attached to an old as well as to a new lighting unit.

It will be understood that while I have elected to illustrate my invention in the specific form of the drawing, I do not wish to be so limited inasmuch as I contemplate variations and modifications within the spirit of the invention and within the scope of the claims contained herein.

What I claim as new and desire to secure by Letters Patent of the United States, is:—

1. In a clamping device, a flange having a threaded opening, a locking element straddling said flange and provided with openings in line with the opening in the flange, one on either side thereof, a screw extending through said openings, said screw having a head of non-circular contour, and means carried by the locking element and engaging the head for locking the screw against rotation.

2. In a lighting unit, a clamping device for the base thereof comprising a flange on said base, a locking element resting on the edge of said flange and having one side located on each side of said flange, each side of said element being perforated, said flange being also perforated, all of said perforations being located in alinement, a screw extending through said perforations and being in threaded engagement with said flange, and means projecting from one of said sides of said locking element for engaging the head of said screw to prevent the latter from rotating, said last element being resilient whereby the screw may be rotated during engagement with said element.

3. In combination in a holding structure, a flange, a screw, a locking element folded over said flange, both sides thereof being perforated, said flange being also perforated, all of said perforations being located in alinement and having a common axis, said screw extending through all of said perforations, holding means for preventing rotation of the screw, said holding means being secured to said element, the latter being secured against rotation by the joint action of said screw and said flange before the head of the screw engages the nearest side of the locking element.

4. In a clamping device, a flange, a locking element with one side located on each side of said flange, each side of said element being perforated, said flange being also perforated, all of said perforations being located in alignment, a screw extending through all of said perforations and being in threaded engagement with said flange, and means projecting from one of said sides of the element for engaging the head of said screw to prevent the latter from rotating.

5. In combination with a flange, a screw, a folded element extending over the sides of said flange, both sides thereof being perforated, said flange being also perforated, all of said perforations being located in alignment, said screw extending through all of said perforations and being in threaded engagement with said flange, holding means for preventing rotation of the screw, said holding means projecting from said folded element, the latter being secured against rotation by the joint action of said screw and said flange, said holding element being resilient whereby the screw may be rotated while in threaded engagement with said flange.

In witness whereof, I have hereunto set my hand this tenth day of December, 1929.

JAMES A. O'NEIL.